United States Patent [19]

Inagoya et al.

[11] Patent Number: 4,870,523
[45] Date of Patent: Sep. 26, 1989

[54] MAGNETIC HEAD APPARATUS USED FOR MOVABLE MAGNETIC MEDIUM WITH HEAD GAP POSITIONING

[75] Inventors: Osamu Inagoya; Hideo Fujiwara; Yoshito Tanaka, all of Ibaraki; Takeshi Ohnuki, Hachioji, all of Japan

[73] Assignee: Hitachi Maxell, Ltd., Osaka, Japan

[21] Appl. No.: 71,348

[22] Filed: Jul. 9, 1987

[30] Foreign Application Priority Data

Jul. 10, 1986 [JP] Japan ................. 61-160710
Jul. 17, 1986 [JP] Japan ................. 61-166764

[51] Int. Cl.$^4$ .............. G11B 5/187; G11B 5/23; G11B 5/12
[52] U.S. Cl. .................... 360/122; 360/119; 360/118; 360/121
[58] Field of Search .............. 360/102, 103, 104, 122, 360/118, 129, 119, 121

[56] References Cited

U.S. PATENT DOCUMENTS

| | | | |
|---|---|---|---|
| 4,191,980 | 3/1980 | King et al. | 360/122 X |
| 4,658,314 | 4/1987 | Sasazaki | 360/103 |
| 4,700,248 | 10/1987 | Coughlin et al. | 360/103 |

FOREIGN PATENT DOCUMENTS

| | | | |
|---|---|---|---|
| 3538632 | 4/1986 | Fed. Rep. of Germany | 360/122 |
| 0130011 | 10/1979 | Japan | 360/103 |
| 0193111 | 10/1985 | Japan | 360/118 |
| 0239413 | 10/1986 | Japan | 360/122 |
| 0269212 | 11/1986 | Japan | 360/118 |

Primary Examiner—Robert S. Tupper
Assistant Examiner—Andrew L. Sniezek
Attorney, Agent, or Firm—Antonelli, Terry & Wands

[57] ABSTRACT

A magnetic head apparatus used for a movable magnetic medium, comprising a magnetic head core in which a recording/reproducing core and an erasing core are respectively disposed on the entrance side of the movable medium and on the exit side of the movable medium, both of the cores being formed as an integrated magnetic core. The head cap of the recording/reproducing core is placed within a range defined between a position spaced about 0% of the longitudinal length of the integrated magnetic core apart from the center of the magnetic core toward the entrance side of the movable medium and another position spaced about 20% of the longitudinal length of the integrated magnetic core apart from the center toward the exit side of the movable medium.

4 Claims, 5 Drawing Sheets

MAGNETIC HEAD APPARATUS USED FOR MOVABLE MAGNETIC MEDIUM WITH HEAD GAP POSITIONING

BACKGROUND OF THE INVENTION

The present invention relates to a magnetic head apparatus which may be suitably used for a magnetic medium such as a floppy disk.

In conjunction with the increasingly widespread use of office computers and personal computers, demand for floppy disk drive systems used as external memory systems has also risen greatly.

In these floppy disk drive systems, since recording and reproduction can be effected on both sides of a floppy disk, two magnetic head apparatus are used, and are disposed in such a manner as to clamp the floppy disk between them.

FIG. 3 is a perspective view illustrating an example of such a conventional magnetic head apparatus, in which reference numeral 1 denotes a support; 2, 3, a slider; 4, a magnetic head; 5, a recording/reproducing core; 5a, a head gap; 6, an erasing core; 6a, 6b, a head gap; and 7, a winding. Numerals 8a, 8b, 8c, 8d, and 8e denote nonmagnetic materials formed of glass which are adapted to restrict the widths of the head gaps of the recording-/reproducing core and the erasing core. Numeral 10 denotes a groove, while numeral 13 denotes a nonmagnetic material for separating the recording/reproducing core and the erasing core from each other.

In FIG. 3, the two sliders 2, 3 are formed on the nonmagnetic support 1, and the magnetic head 4 is installed in one slider 3. The surfaces of the sliders 2, 3 and the magnetic head 4 are in the same plane, and respectively constitute sliding surfaces for a medium. The recording head 4 is constituted by a magnetic head core in which the recording/reproducing core 5 and the erasing core 6 are formed integrally as well as windings 7 which are provided around the recording/reproducing core 5 and the erasing core 6, respectively. The recording/reproducing core 5 has a head gap 5a of a predetermined track width, while the erasing core 6 has the two head gaps 6a, 6b which are distanced from each other substantially in correspondence with the track width of the head gap 5a.

In a floppy disk drive system, such a magnetic head apparatus is installed in such a manner that the recording/reproducing core 5 and the erasing core 6 are aligned in the direction of flow of the medium (i.e., in a direction tangential to a circle with respect to the center of the floppy disk, as shown by the arrow A), and that the former is disposed on the entrance side (IN) of the head where the medium enters, and the latter on the exit side (OUT) thereof. Hence, if recording is effected by the head gap 5a of the recording/reproducing core 5, erasing is carried out by the head gaps 6a, 6b of the erasing core 6 at the opposite edge portions of the track, thereby allowing a predetermined width of track to be obtained.

In a floppy disk drive system, two units of such magnetic head apparatus are used, and are disposed in such a manner as to clamp a floppy disk on both sides. In other words, as shown in FIG. 4, such a magnetic head apparatus 18 is installed on a carriage 20 via a gimbal 19. The arrangement is such that, as shown in FIG. 5, two magnetic head apparatus 18, 18' mounted on different carriages 20, 20' are disposed on both sides of a floppy disk 9. In this case, the sliding surface for the magnetic head 4 of one magnetic head apparatus is opposed to the sliding surface for the slider 2 of the other magnetic head apparatus. The thickness of the gimbal 19' installed on the substrate on the lower side of the floppy disk 9 is made very thick so as to substantially secure the magnetic head apparatus 18'. However, the gimbal 19 installed on the carriage 20 on the upper side of the floppy disk 9 is so arranged as to allow the magnetic head apparatus 18 to readily follow with the undulation of the floppy disk surface, and the center of the gimbal is pressed by a pivot 12 provided in the carriage 20. The position at which the magnetic head apparatus 18 is pressed by this pivot 12 is slightly deviated from the center thereof toward to the magnetic head 4. Consequently, the medium sliding surface of the magnetic head 4 is brought into pressure contact with the floppy disk 9, and the magnetic head apparatus is capable of following any undulation of the floppy disk surface, thereby minimizing any spacing loss caused by a gap between the sliding surface of the magnetic head apparatus and the floppy disk surface.

When such conventional magnetic head apparatus are used in floppy disk drive systems, although there are some cases where outputs of magnetic head are above a desired level, there are a fairly large number of cases where the outputs are below the desired level. If floppy disks using metal magnetic powders are employed, the manufacturing yield of those magnetic head apparatus for which the outputs of a desired level or greater were obtained was found to be about 80%.

Conceivably, this is attributable to the following reason: In the conventional magnetic head shown in FIG. 3, the overall length of the recording/reproducing core 5 (the length in the direction of the arrow A) is equal to the overall length of the erasing core 6. In addition, if this magnetic head apparatus is installed in a floppy disk drive system, as shown in FIG. 5, the magnetic head apparatus 18 is inclined with the pressing point of the pivot 12 as a center in correspondence with the undulation of the surface of the floppy disk 19, so that the state of the pressure contact with the floppy disk is deemed to become optimum in the vicinity of pressure contacting point of this pivot 12, i.e., at the boundary between the recording/reproducing core and the erasing core 6 in the case of the magnetic head 4 shown in FIG. 3. In view of these facts, it is preferred that the head gap 5a of the recording/reproducing core 5 and the head gaps 6a, 6b of the erasing core 6 are disposed at locations where this state of pressure contact is optimum. Because of mutual interference and other factors, however, the head gap 5a of a conventional recording/reproducing core 5 has been disposed at a position offset approximately 20% of the overall length L of this magnetic head 4 from the center of the longitudinal length of the magnetic head 4 (i.e., in the direction of movement of the medium shown by the arrow A) toward the entrance side (IN) of the medium.

However, if this conventional magnetic head is disposed as shown in FIG. 5, and the floppy disk 9 is rotated, the present inventors have found that the magnetic head apparatus 18 is inclined by this rotation on the side which has been pressed by the pivot 12 in such a manner that the gap between the two magnetic head apparatus 18, 18' opens on the entrance side of the medium, and that the state of pressure contact of the magnetic heads 4, 4' with the floppy disk 9 on the entrance side of the medium becomes degraded, which results in an increased spacing loss, thereby causing decrease in output of magnetic head.

It goes without saying that there are cases where head outputs exceeding a desired level are obtained by installing such conventional magnetic head apparatus in floppy disk drive systems. The yield at that case is approximately 80%, as described above. From this fact, it can be considered that the yield is affected by the state of installation of the magnetic head apparatus in the floppy disk drive systems. However, an attempt to enhance the installation accuracy of the magnetic head apparatus in such a manner as to further improve the yield is very difficult in view of the relative precision of various parts including the gimbal 19 and pivot 12, and causes a problem regarding the productivity of floppy disk drive systems.

In addition, in a disk drive system using a magnetic disk which is capable of recording and reproducing on both sides thereof, a pair of magnetic head apparatus are provided, and the magnetic disk is clamped therebetween to effect recording and reproduction on both sides thereof. In a case where a magnetic disk is flexible as in a case of a floppy disk, there has been known another conventional magnetic head apparatus arranged such that a recording/reproducing core and an erasing core both formed integrally are secured to one leg portion (hereafter referred to as a "first leg portion"; and the other having no magnetic core being referred to as a "second leg portion") of a core support constituted by ceramics or the like, two leg portions being spaced apart from each other by a predetermined distance. The end surfaces of these first and second leg portions are in a common plane and constitute sliding surfaces for the recording medium such as the floppy disk. In addition, the sliding surface of the magnetic head core secured to the first leg portion is also located in this common plane.

Two units of the magnetic head apparatus having the above-described arrangement are installed in a disk drive apparatus in such a manner as to clamp the disk between them. In this case, the first leg portion of one magnetic head apparatus is disposed such as to oppose the second leg portion of the other magnetic head apparatus, and the magnetic disk is clamped by the first leg portion of one magnetic head apparatus and the second leg portion of the other magnetic head apparatus. This second leg portion is a mere slider, but has the function of bringing the magnetic disk stably into contact with the magnetic head core.

In order to enchance the recording/reproducing characteristics of a disk drive system, the pressure contact force of the respective magnetic head apparatus against the magnetic disk may be increased so as to obtain more intimate contact between the magnetic head cores and the magnetic disk. On the other hand, as the load on the magnetic disk increases, the abrasion of the surface of the magnetic disk increases rapidly. To cope with this situation, another conventional magnetic head apparatus has been proposed which is arranged so that the width of the first leg portion to which the magnetic head core is secured is narrowed to make the area of the sliding surface of the first leg portion smaller than the area of the sliding surface of the second leg portion and so that, when the two magnetic head apparatus are arranged, the inner edge of the first leg portion is aligned with the inner edge of the second leg portion.

According to this conventional magnetic head apparatus, even if the contacting force of the magnetic head apparatus against the magnetic disk is increased, the load on the magnetic disk and the abrasion occurring on its surface can be reduced. However, there has been a problem in that, if the two magnetic head apparatus are deviated by the slightest degree from the above-described positional relationship, deflection occurs in the magnetic disk due to the pressure-contact force of the magnetic head apparatus, and damage is caused on its surface. In addition, as a finishing process of such magnetic head apparatus, after the magnetic head cores are secured, the end surfaces of the first and second leg portions are polished to form the sliding surfaces of the magnetic head. However, since the core support and the magnetic head core are formed of different kinds of materials, that is, the former is made of ceramics and the latter of ferrite, it is extremely difficult to have the sliding surfaces for both the magnetic head core portion and the other portion in the first leg portion included in a common plane. Normally, the sliding surface for the magnetic head core is recessed from the sliding surface of the other portion. For this reason, there has been another problem in that the contact between the magnetic disk and the magnetic head core is degraded, resulting in a reduction in recording/reproducing characteristics.

Therefore, to overcome these problems, the present inventors proposed a magnetic head apparatus (Japanese Patent Application No. 165566/1984) which is arranged such that a magnetic head core 3 is secured to a core support 1 having only one leg portion 2, and this magnetic head core 3 serves as the first leg portion, and another leg portion of the core support serving as the second leg portion. This magnetic head apparatus will be described hereafter with reference to FIGS. 10A and 10B. FIG. 10A is a top plan view of the magnetic head apparatus, while FIG. 10B is a cross-sectional view thereof. Reference numeral 1 denotes a core support; 2, a second leg portion; 3, a magnetic head core; 4, an erasing core; 5, a recording/reproducing head core; 6a, 6b, 5a, a head gap; 8a to 8e, a nonmagnetic material, such as glass, for magnetically separating the recording-/reproducing head core 5 and the erasing head core 4 from each other.

In the drawings, the core support 1 formed of ceramics or the like has a projecting second leg portion 2, and the magnetic head core 3 is secured to an end portion thereof opposite to the second leg portion 2 of the core support 1. This magnetic head core 3 constitutes the first leg portion relative to the leg portion 2. The end surfaces of the second leg portion 2 and the magnetic head core 3 respectively constitute sliding surfaces for the medium and are included in the same plane.

The magnetic head core 3 is arranged in such a manner that the erasing head core 4 and the recording/reproducing head core 5 are formed integrally. These members are arranged such that the erasing head core 4 scans after the portion of the magnetic disk is scanned by the recording head core 5. The recording head core 5 has one head gap 5a, and its track width is restricted to a predetermined width by means of the glass 8a, 8b.

The width of the magnetic head core 3 is set to be smaller than the width of the second leg portion 2, and the former's sliding surface for the medium is smaller than the latter's sliding surface for the medium. When the magnetic head apparatus thus arranged are installed in a disk drive system, as shown in FIG. 11, a gap between the magnetic head core 3 and the second leg portion is set in such a manner that the magnetic head core 3 of one magnetic head apparatus is placed substantially at the central portion of the second leg portion 2 of the other magnetic head apparatus, and the magnetic head apparatus are thus installed.

According to the magnetic head apparatus having the above-described arrangement, the sliding surface of the magnetic head core 3 is necessarily opposed to the sliding surface of the second leg portion to clamp the magnetic disk 9. Therefore, the deflection of the magnetic disk 9 is reduced, and the occurrence of damage to the surface thereof can be prevented, and sliding surfaces of both the magnetic head core 3 and the second leg portion 2 can readily be included in the same plane.

With this magnetic head core 3, the contact thereof with the magnetic disk is optimum at the central portion of its sliding surface for the medium. Accordingly, in order to optimize the recording/reproducing characteristics, the head gap 5a of the recording/reproducing head core 5 in FIG. 10A is arranged in such a manner that the center of the track width corresponds with the center of the width of the magnetic head core 3.

Although it has been described that, according to the above-described magnetic head apparatus, the deflection of the magnetic disk 9 is reduced, deflection actually occurs slightly in the magnetic disk 9 at the edge portion of the sliding surface of the magnetic head core 3. This is attributable to the fact that the outer portion of the sliding surface of the magnetic disk 9 tends to separate from the sliding surface of the second leg portion 2 due to a layer of air. In FIG. 11, this deflection is relatively large at the side opposite to the groove 10 defined between the second leg portion 2 and the magnetic head core 3 with respect to the sliding surface of the magnetic head core 3. On the side of the groove 10, a pressing force against the sliding surface of the leg portion 2 occurs in the magnetic disk 9 because of the flow of air in the groove 10, so that practically no deflection is caused in the magnetic disk 9.

Meanwhile, the edge portion of the sliding surface of the conventional magnetic head core 3 is squarely shaped, with the result that there has been such a problem that damage is apt to be caused in the surface of the magnetic disk at this edge portion due to the deflection of the magnetic disk 9. For this reason, it can be conceived that the edge portion opposite to the groove 10 of the sliding surface for the medium may be rounded.

However, in view of preventing both the load applied to the magnetic disk 9 and the abrasion of the surface of the magnetic disk 9 from increasing, the width of the magnetic head core 3 is made narrow, so that, if the width of the area to be rounded (a round) is enlarged, this round will reach as far as the vicinity of the head gaps 6b, 5a of the magnetic head core 3. If this round is provided, the contact of the magnetic disk 9 will be degraded on the side provided with rounding for the sliding surface of the magnetic head core 3. However, if this round reaches as far as the vicinity of the head gaps 6b, 5a, an intimate contact of the magnetic disk 9 will be degraded at the head gaps 6b, 5a. Consequently, the erasing characteristics and recording/reproducing characteristics will be degraded. In actuality, therefore, it has been hitherto impossible to enlarge the width of the rounding allowance. That is, it has been impossible to sufficiently obtain the effect of providing a round regarding the sliding surface of the magnetic head core 3, and it has therefore been unavoidable for the surface of the magnetic disk 9 to be subjected to damage.

SUMMARY OF THE INVENTION

Accordingly, an object of the present invention is to provide a magnetic head apparatus which is capable of improving the state of contact defined between a medium and the core gap of a recording/reproducing core, thereby overcoming the drawbacks of the prior art.

Another object of the present invention is to provide a magnetic head disk which is capable of obtaining good characteristics and makes it possible to prevent damage from occurring on the surface of a magnetic disk at an edge portion of the sliding surface of a magnetic head core, thereby overcoming the drawbacks of the prior art.

To this end, according to the present invention, there is provided a magnetic head apparatus comprising a magnetic head core in which a recording/reproducing core and an erasing core are respectively disposed on the entrance side of a medium and on the exit side of the medium and are formed as an integrated magnetic core, the head gap of the recording/reproducing core being placed within a range defined between a position spaced about 0% of the longitudinal length of the integrated magnetic core apart from the center of the magnetic core toward the entrance side of the medium and another position spaced about 20% of the longitudinal length of the integrated magnetic core apart from the center toward the exit side of the medium.

According to another aspect of the present invention, there is provided a magnetic head apparatus comprising first and second leg portions having sliding surfaces disposed in a common plane, the first leg portion being constituted by a magnetic head core, the second leg portion functioning as a slider, an area of the sliding surface of the first leg portion being smaller than another area of the sliding surface of the second leg portion, the position of the head gap in the magnetic head core of the first leg portion being displaced toward the side of the second leg from the center of the width of the first leg portion.

DESCRIPTION OF THE PREFERRED EMBODIMENT

Referring now to the accompanying drawings, description will be made of the embodiments of the present invention.

Figure 1:
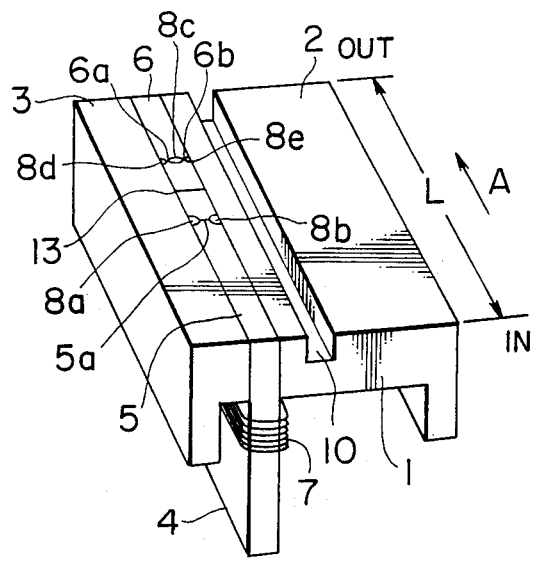
FIG. 1 is a perspective view illustrating an embodiment of a magnetic head apparatus in accordance with the present invention.
Figure 3:
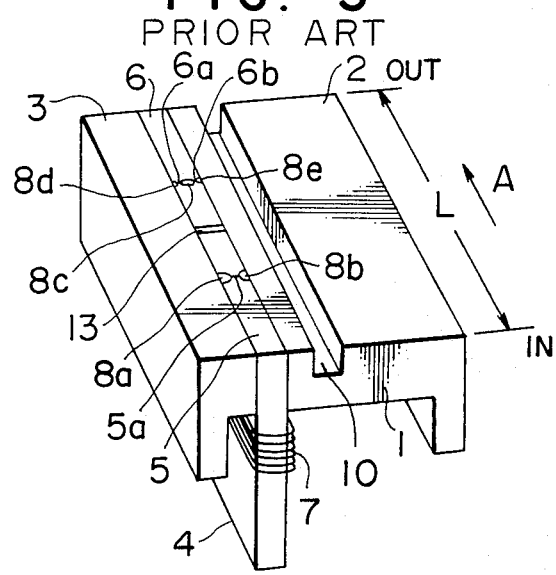
FIG. 3 is a perspective view illustrating a conventional magnetic head apparatus.

FIG. 1 is a perspective view illustrating an embodiment of a magnetic head apparatus in accordance with the present invention. Portions that are similar to those shown in FIG. 3 are denoted by the same reference numerals, and descriptions regarding the same constitution as that of FIG. 3 will be omitted.

In FIG. 1, a head gap 5a of a recording/reproducing core 5 was located at a position within a range defined between a position spaced about 0% of the longitudinal length (i.e. the length in a direction (A)) of the integrated magnetic core 4 (i.e. the recording/reproducing core 5 plus the erasing core 6) apart from the center of the integrated magnetic core 4 toward the entrance side of a recording medium (corresponding to the medium 9 in FIG. 5) rotating in the direction (A) and another position spaced about 20% of the longitudinal length of the integrated magnetic core apart from the center toward the exit side of the medium. Other arrangements were the same as those of the conventional magnetic head apparatus shown in FIG. 3.

Figure 2:
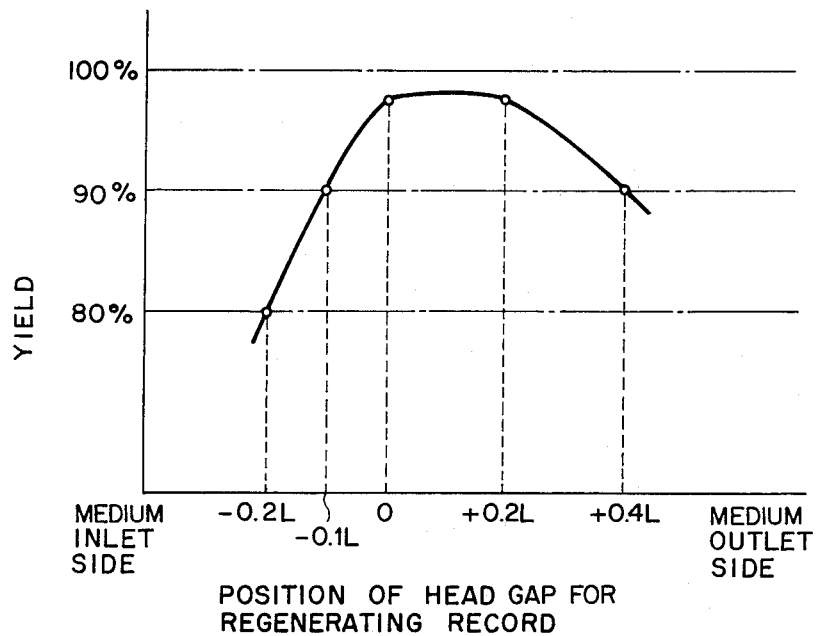
FIG. 2 is a graph illustrating the results of measurement of the relationships between the position of a head gap for recording and reproduction in the longitudinal length of a magnetic head and the yield of magnetic head apparatus.
Figure 4:
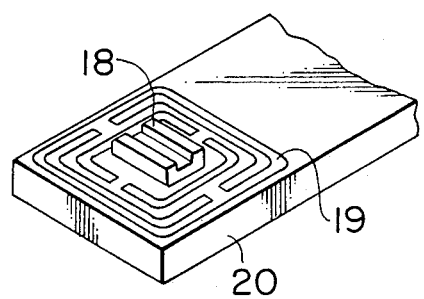
FIG. 4 is a perspective view illustrating the state of installation of a magnetic head apparatus on a carriage.
Figure 5:
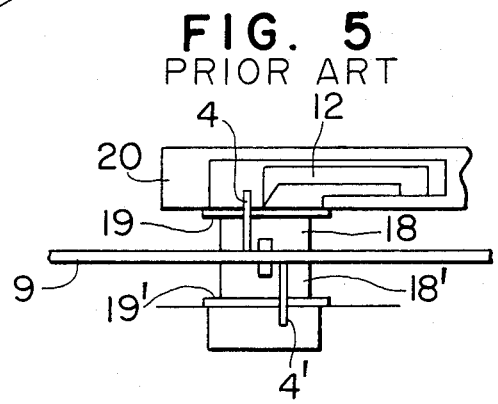
FIG. 5 is a cross-sectional view illustrating the positional relationships of two magnetic head apparatus in a floppy disk drive system.

When the magnetic head apparatus according to this embodiment in which the head gap 5a was disposed at the center of the longitudinal length of the magnetic head 4 were installed in a floppy disk drive system as shown in FIGS. 4 and 5, and there was examined the yield of magnetic head apparatus capable of obtaining desired outputs of magnetic head by employing floppy disks of metallic magnetic powders, with the result that the yield was 95% or more. Thus, the yield was improved substantially in comparison with the value of about 80% for conventional magnetic head apparatus. In this case, the conditions were the same as those for the conventional apparatus. That is, Mn-Zn ferrite was used for the magnetic head core, the length of the head gap 5a of the recording/reproducing core 5 was set to 0.3 μm, barium titanate was used as sliders 2, 3, and the length L, width, and height of the support 1 were set to 5.0 mm, 3.5 mm, and 2.6 mm, respectively. Furthermore, the yield was measured by varying the position of the head gap 5a of the recording/reproducing core 5, the results shown in FIG. 2 being obtained. It can be appreciated from FIG. 2 that, according to this invention, the yield becomes 95% or above and that the contact of the magnetic head with the floppy disk is stabilized.

As described above, according to the present invention, the contact with the medium (such as floppy disk) at the head gap for recording and reproduction is improved remarkably and is stabilized, so that the yield can be improved and these magnetic head apparatus are very suitable for mass production. In addition, since a spacing loss can be reduced substantially, and a high head output can be obtained, the magnetic head apparatus in accordance with this invention is very suitable for high-density recording.

Referring now to FIGS. 6A, 6B, 7, 8, and 9, description will be made of another embodiment of the present invention.

Figure 6A:
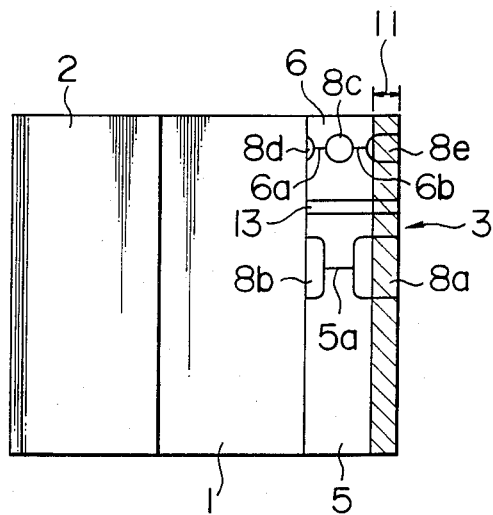
FIG. 6A is a top plan view illustrating another embodiment of a magnetic head apparatus in accordance with the present invention.
Figure 6B:
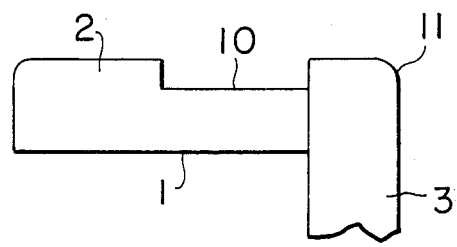
FIG. 6B is a cross-sectional view of FIG. 6A.
Figure 10A:
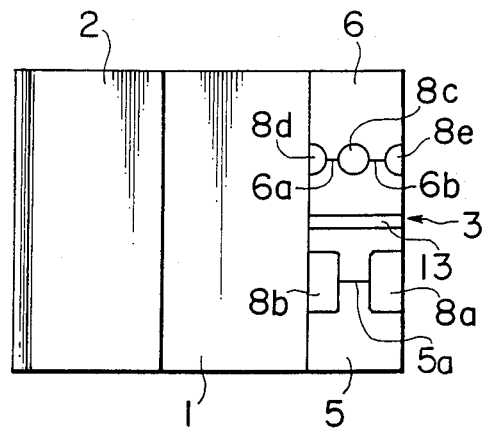
FIG. 10A is a top plan view illustrating a conventional magnetic head apparatus which the present inventors et al. proposed earlier.
Figure 10B:
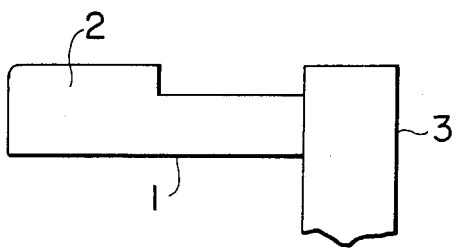
FIG. 10B is a cross-sectional view of FIG. 10A.
Figure 11:
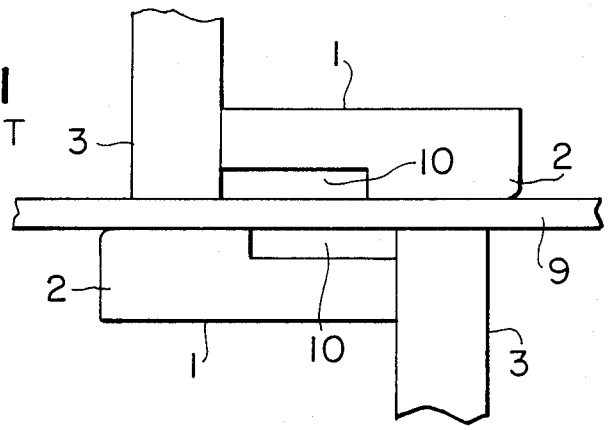
FIG. 11 is an explanatory view illustrating a state in which said disk apparatus is used.

FIG. 6A is a top plan view illustrating another embodiment of a magnetic head apparatus in accordance with the present invention, while FIG. 6B is a cross-sectional view thereof, in which reference numeral 11 denotes a round. Portions corresponding to those of FIG. 10A are denoted by the same reference numerals, and descriptions regarding the same constitution as that of FIG. 10A are omitted.

In FIGS. 6A, in the magnetic head core 3, the head gap 5a of the recording/reproducing head core 5 was displaced in such a manner that the center of the track width thereof was spaced apart from the widthwise center of the magnetic head core toward the groove 10. In conformity therewith, the head gaps 6a, 6b of the erasing head core 4 were similarly spaced toward the side of the groove 10 so as to be aligned with the opposite edge portions of the head gap 5a.

As shown in FIG. 6B, the edge portions on the side opposite to the groove 10 of the sliding surface for a recording medium were rounded. However, since a sufficiently wide blank margin is provided on the side of the magnetic core opposite to the groove, the radius of this round can be made large, so that a large round 11 can be provided.

Figure 7:
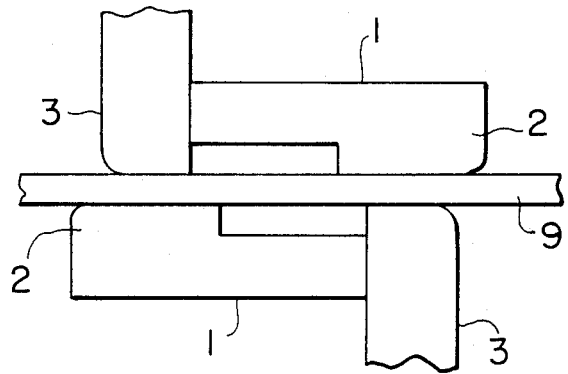
FIG. 7 is an explanatory view illustrating a state in which the disk apparatus of this embodiment is used.

Consequently, as shown in FIG. 7, when the magnetic head apparatus of this embodiment was applied to a disk drive system, the effect of the round was brought about remarkably, and the damage of the surface due to the deflection of the magnetic disk 9 was prevented. In addition, in FIG. 6, since each of the head gaps 6a, 6b, 5a was displaced to be spaced apart from the round 11, the contact of the magnetic disk with these portions was improved, with the result that the characteristics of the magnetic head core 3 were enhanced.

Figure 8:
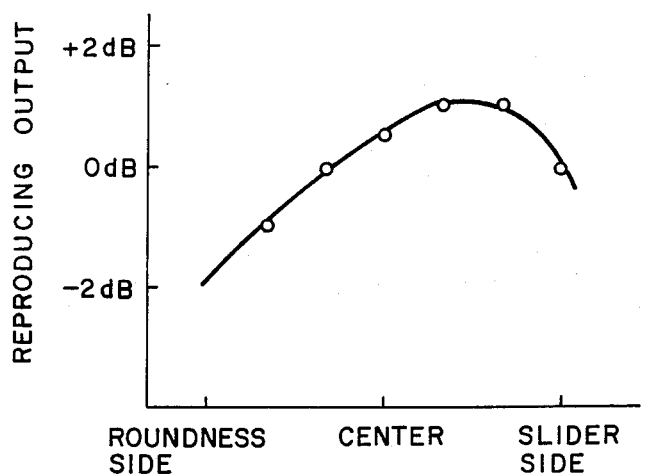
FIG. 8 is a characteristic diagram illustrating reproduction output varying in dependence on the position of the head gap according to this embodiment.

FIG. 8 is a characteristic diagram illustrating reproducing output varying in dependence on the amount of deviation of the widthwise center of the track of the head gap 5a from the widthwise center of the first leg provided with the magnetic head core. As is apparent from FIG. 8, since the contact of the magnetic medium is optimum in the widthwise center of the sliding surface of the magnetic head core 3 which center is defined with the exception of the round 11, it is most preferable to locate each of the head gaps 6a, 6b, 5a in such a manner that the center of the track width of the head gap 5a is aligned with this center of the sliding surface.

Figure 9:
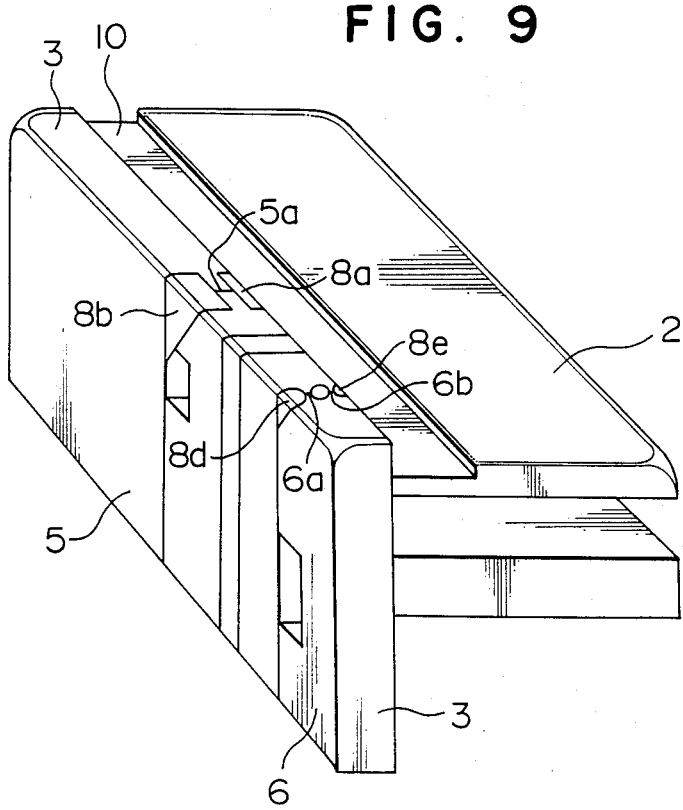
FIG. 9 is a perspective view illustrating the overall arrangement of the embodiment shown in FIG. 6A.

FIG. 9 is a perspective view illustrating an overall arrangement of the embodiment shown in FIG. 6.

As described above, according to the present invention, even the edge portion of the sliding surface of the magnetic head core is provided with a round with a large radius, so that the contact of the magnetic disk with the head gaps is improved. Accordingly, it is possible to prevent damage from occurring on the surface of the magnetic disk due to the deflection of a magnetic disk having been caused at the edge of the magnetic head apparatus.

What is claimed is:

1. A magnetic head arrangement used for a movable magnetic medium, comprising first and second joined sections extending in a longitudinal direction and having sliding surfaces respectively, disposed in a common plane, said first section consisting of a magnetic head core, said second section functioning as a slider, an area defined by said sliding surface of said first section being smaller than another area defined by said sliding surface of said second section, said magnetic head core of the first section having a head gap disposed toward the adjoining side of said second section from the center of the width of said first section.

2. A magnetic head arrangement according to claim 1, wherein said magnetic head core a longitudinal length extending in said longitudinal direction and is disposed with respect to the movable medium so that the movable medium during movement thereof moves with respect to said magnetic head core so that a point thereon first moves past one side of magnetic head core in the direction of the longitudinal length and then moves past another side of said magnetic head core in the direction of the longitudinal length, said magnetic head core having a recording/reproducing core and a erasing core respectively disposed proximate to the one side and the another side of said magnetic head core, said recording/reproducing core having a head gap placed within a range defined between a position spaced about 0% of the longitudinal length of the magnetic head core apart from the center of the longitudinal length of the magnetic head core toward the one side of the magnetic head core and another position spaced about 20% of the longitudinal length of the magnetic head co apart from the center toward the another side of the magnetic head core.

3. A magnetic head arrangement according to claim 1, wherein a groove extending in parallel to the longitudinal direction of said first section is formed between said first section and said second section.

4. A magnetic head arrangement according to claim 2, wherein the head gap of said recording/reproducing core is restricted in the width direction the magnetic head core by a magnetic material made of glass.

* * * * *